United States Patent [19]

Imayoshi

[11] Patent Number: 4,519,123
[45] Date of Patent: May 28, 1985

[54] METHOD OF MOUNTING VEHICLE WIPER MECHANISM

[75] Inventor: Kiyoyuki Imayoshi, Toyota, Japan

[73] Assignee: Toyota Jidosha Kabushiki Kaisha, Toyota, Japan

[21] Appl. No.: 464,108

[22] Filed: Feb. 4, 1983

[30] Foreign Application Priority Data

Feb. 5, 1982 [JP] Japan ................. 57-017254

[51] Int. Cl.³ ............................................. B60S 1/08
[52] U.S. Cl. ................... 29/434; 15/250.34; 29/453; 29/525
[58] Field of Search ............... 29/434, 453, 469, 525; 15/250.34, 250.31

[56] References Cited

U.S. PATENT DOCUMENTS 2,850,755  9/1958  Deibel ........................ 15/250.34
4,009,502  3/1977  Tamaui et al. ............. 15/250.31 X Primary Examiner—Howard N. Goldberg
Assistant Examiner—Timothy V. Eley
Attorney, Agent, or Firm—Kenyon & Kenyon

[57] ABSTRACT

A method of mounting a vehicle wiper mechanism, wherein a wiper link is inserted into a cowl through an air duct hole provided in a cowl top. A hook provided in the vicinity of a socket joint at one end of the wiper link is temporarily engaged with an edge of an insertion hole in a cowl fore plate for receiving a wiper motor shaft. A ball joint at the end of a crank fixed to the wiper motor shaft is inserted from the engine side of the fore plate into the socket joint of the wiper link that is exposed through the insertion hole for receiving the wiper motor shaft. Upon completion of this connection the hook of the wiper link is disengaged from the cowl fore plate, and the motor shaft is inserted through the hole to permit securing the wiper motor to the cowl. In this way the wiper motor and wiper link are easily connected to each other without requiring a separate access hole.

4 Claims, 7 Drawing Figures

METHOD OF MOUNTING VEHICLE WIPER MECHANISM

BACKGROUND OF THE INVENTION

1. Field of the Invention

The present invention relates to a method of mounting a vehicle wiper mechanism, and more particularly to an improved method of mounting the vehicle wiper mechanism, wherein connection between a wiper link and a wiper motor is facilitated.

2. Description of the Prior Art

In the case of a normal vehicle body, a wiper for a vehicle converts a turning driving force of a wiper motor affixed to an engine into a reciprocatory motion through a predetermined angle by means of the wiper link and imparts the same to a wiper arm. A multiplicity of components are assembled at the side of a compartment and at the side of a engine room below a front window of the vehicle, whereby the aforesaid wiper motor is disposed at one side of the vehicle and at the side of the engine as a countermeasure of anti-noise pollution, and normally, secured to a cowl fore plate from the side of the engine by means of screws or the like. Consequently, the wiper link for connecting the wiper motor to the wiper arm is incorporated in a cowl, a turning support portion thereof is rotatably supported in the cowl and one end thereof is connected to the wiper motor through a joint.

FIG. 1 shows the conventionally assembled state of the vehicle wiper mechanism, wherein a wiper motor 10 is threadably coupled to a fore plate 16 of a cowl 14 from the side of an engine 12, and, in this state, a joint 22 of a wiper link 20 is connected to a joint 18 of the wiper motor 10 projecting toward the cowl 14.

Consequently, in the prior art, joints 18 and 22 must be accurately connected to each other in the cowl 14 having a small space. This connection is achieved such that joints 18 and 22 are pressfitted under a pressing force beyond a predetermined value, e.g., a force of more than 18 Kg. Hence, this connecting work has been considered to be very difficult. In practice, the pressing force during the aforesaid assembling is required to be strictly controlled. If the pressing force is inaccurate in value, then disadvantages have been presented. In particlular the joints are dislodged from each other, looseness therebetween tends to be increased in value, durability is lowered, sealing properties at the joint portion are deteriorated or noises are generated. Thus, it has been difficult to lower the value of the aforesaid pressing force in order to improve the workability.

In the prior art, to perform the aforesaid connecting work in the cowl 14, a service hole 26 for facilitating the connecting work is provided in a cowl top 24 of the cowl 14. Thus, heretofore the connecting work has been performed by a worker putting his hand into the cowl 14 through the service hole 26 during assembly.

However, in order to maintain the mechanical strength of the cowl 14, it is necessary to make this service hole 26 as small as possible, and hence, there has been presented the disadvantage of being unable to secure a satisfactory space for the connecting work.

Furthermore, the service hole 26 is disposed in the vicinity of an air duct of a heater blower. Hence, there is a possibility of intrusion of air or storm water from outside. To overcome this problem, it is necessary to hermetically seal by use of a suitable cover for preventing water or other substances from flowing into the compartment upon completion of the assembly of the wiper mechanism, thus presenting the disadvantage that the number of man-hours and the cost for assembly are increased. Further, the aforesaid sealing work must be carried out in a very limited space with great difficulty.

SUMMARY OF THE INVENTION

The present invention has been developed to obviate the disadvantages of the prior art and its object is to provide an improved method of mounting a vehicle wiper mechanism, wherein a wiper motor and a wiper link are easily and reliably connected to each other without requiring a service hole as in the prior art.

To this end, the present invention features that the wiper link is inserted into a cowl through an air duct hole provided in a cowl top, a hook, provided in the vicinity of a rotary joint connected at one end of the wiper link, is temporarily engaged with an edge of an insertion hole in a cowl fore plate for receiving a wiper motor shaft. A mating rotary joint connector on a crank fixed to a shaft of the wiper motor is connected from the engine side of the cowl fore plate to the rotary joint connector of the wiper link exposed through the insertion hole for receiving the wiper motor shaft. The hook of the wiper link is disengaged from the cowl fore plate upon completion of the aforesaid connection, and the wiper motor is affixed to the cowl.

DETAILED DESCRIPTION OF THE EMBODIMENT

A preferred embodiment of the present invention will hereunder be described with reference to the drawings.

Figure 1:
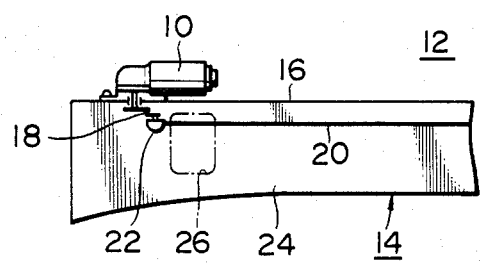
FIG. 1 is an explanatory view showing the essential parts of the conventional vehicle wiper mechanism.
Figure 2:
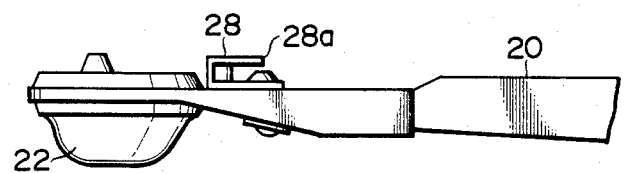
FIGS. 2, 3 are a front view and plan view showing the preferred embodiment of a vehicle wiper link used in the present invention.
Figure 3:
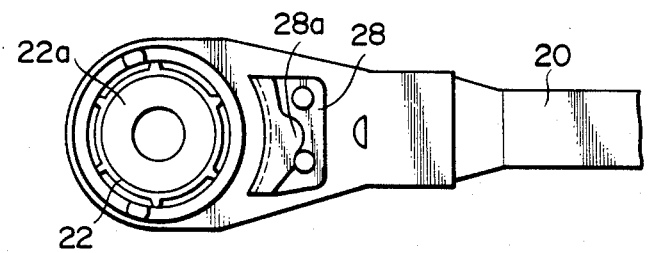

FIGS. 2 and 3 show the essential portions of the wiper link for use in the present invention, a well-known rotary joint connector 22 hereafter referred to as joint 22 is affixed to one end of a wiper link 20, the joint 22 is made of a flexible material such as a synthetic resin, and a rotary joint connector 18 hereafter referred to as joint 18 of a wiper motor 10 is press-fitted into a central space 22a of the joint 22, so that joints 18 and 22 can be rotatably and non-dislodgingly connected to each other.

The present embodiment is characterized by the provision of a hook 28 in the vicinity of an end of the joint of the aforesaid wiper link 20. As will be described hereunder, in connecting the wiper link 20 to the wiper motor 10, the wiper link 20 can be temporarily engaged with the cowl fore plate 16 by means of the aforesaid hook 28, so that the connecting work can be very easily carried out.

The hook 28 shown in the embodiment is formed of a metal plate bent into a shape of a hook firmly affixed to the wiper link 20 through rivets, an engaging piece 28a of the hook 28 is formed at one end thereof into a circular arcuate shape in a manner to fit in with an insertion hole for receiving a motor shaft to be described hereunder, and formed at the other end thereof into a shape having a projected central portion in a manner to be easily engageable with an edge of the insertion hole.

FIGS. 4, 5, 6 and 7 show the method of mounting the vehicle wiper mechanism according to the present invention, following the stages of work successively.

Figure 4:
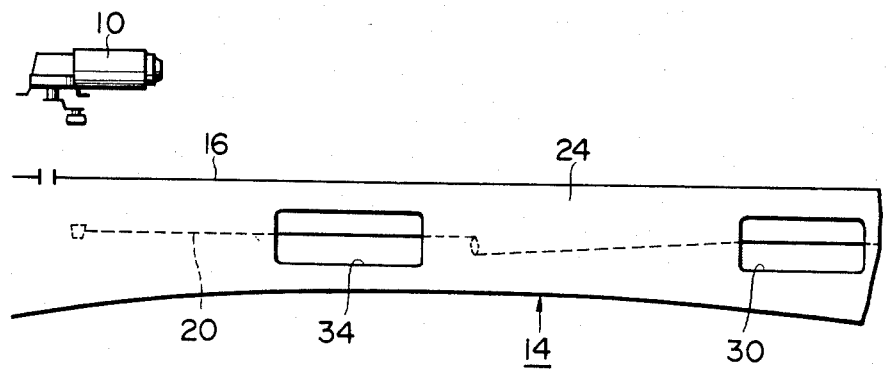
FIGS. 4, 5, 6 and 7 are illustrations showing the mounting process in the embodiment of the present invention.

FIG. 4 shows the state where the wiper link 20 is inserted into the cowl 14. The wiper link 20 is inserted into the cowl 14 through an air duct 30 provided in a cowl top 24 and a shaft portion of the wiper link 20 is rotatably supported in the cowl 14 as necessary. In this condition, the wiper motor 10 is not affixed to the cowl fore plate 16 unlike in the prior art.

Figure 5:
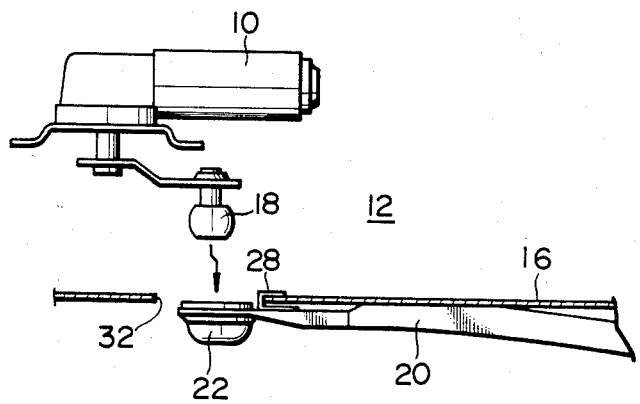

FIG. 5 shows the state where the wiper link 20 is temporarily engaged with the cowl fore plate 16, i.e., the hook 28 is temporarily engaged with an edge of an insertion hole 32 in the cowl fore plate 16 for receiving a wiper motor shaft. This engagement is achieved such that a worker grasps the wiper link 20, passes the same through an air duct 34 provided in the cowl top 24 and engages the hook 28 of the wiper link 20 with the edge of the insertion hole 32 for receiving the wiper motor shaft of the cowl fore plate 16. The aforesaid temporary engagement can be achieved by a simple operation without any need for a special service hole in the vicinity of the joint 22 as seen in the prior art.

As aforesaid, the hook 28 is formed into a shape fitting in with the insertion hole 32, and the worker can effect an easy engagement of the hook 28 by the presence of the partially projected portion without directly inspecting the engageable portion. In the engaged state shown in FIG. 5, the hook 28 firmly holds the cowl fore plate 16, whereby the joint 22 is controlled in most of its movement, so that the axis of the joint 22 can be held accurately perpendicular to the surface of the cowl fore plate 16.

Consequently, in this state of the temporary engagement, when the wiper motor 10 is made to approach the wiper link 20 from the side of the engine 12 and the joint 18 of the wiper motor 10 is press-fitted into the joint 22 of the wiper link 20 in a direction indicated by an arrow, joints 18 and 22 can be easily achieved.

Figure 6:
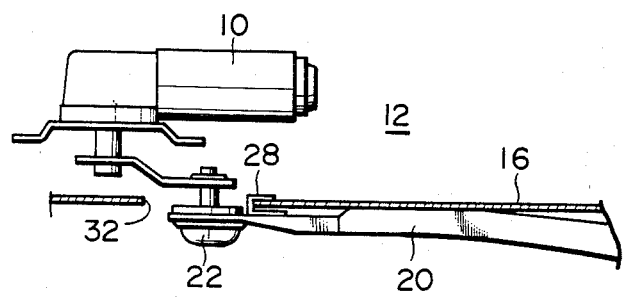

FIG. 6 shows the state where the joint 18 of the wiper motor 10 is press-fitted in the joint 22 of the wiper link 20, whereby the wiper link 20 can be accurately connected to the wiper motor 10.

Figure 7:
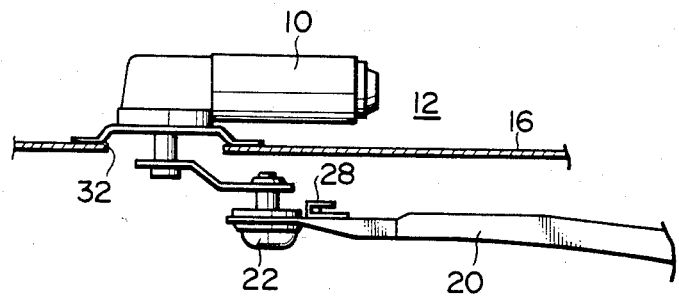

Upon completion of connection between the wiper motor 10 and the wiper link 20 at the side of the aforesaid engine 12, the hook 28 of the wiper link 20 is disengaged from the insertion hole 32 for receiving the wiper motor shaft as shown in FIG. 7, the shaft of the wiper motor 10 is led into the insertion hole 32, and, in this state, the wiper motor 10 is firmly affixed to the cowl fore plate 16 by means of screws or the like, thereby completing the mounting of the wiper mechanism.

As has been described hereinabove, according to the present invention, once the wiper link is temporarily engaged with the cowl fore plate, a series of operations of mounting the wiper mechanism can be all effected from the side of the engine.

In order to temporarily engage the wiper link with the cowl fore plate, it is merely necessary to engage the hook with the insertion hole for receiving the wiper motor shaft, so that the engagement can be achieved very easily. Furthermore, in this state of the engagement, the joint of the wiper link is accurately positioned and settled in the movement such as rolling, so that the connection between the wiper link and the wiper motor can be very easily carried out.

Further, according to the present invention, a small amount of work is needed at the side of the cowl, whereby no special service hole need be provided, so that the production cost of the cowl itself can be reduced. Moreover, as a result of eliminating the necessity of the service hole which may be required in the prior art and the necessity of the cover for sealing the service hole, the number of man-hours and the cost for production during production and assembly of the vehicle can be reduced to a considerable extent.

What is claimed is:

1. A method of mounting a vehicle wiper mechanism, the method comprising: inserting a wiper link into a cowl through an air duct hole provided in a cowl top, temporarily engaging a hook, provided in the vicinity of a rotary joint connector at one end of said wiper link, with an edge of an insertion hole in a cowl fore plate for receiving a wiper motor shaft, connecting a mating rotary joint connector on a crank fixed to a shaft of a wiper motor located on an engine compartment side of said fore plate to said rotary joint connector of the wiper link exposed through said insertion hole for receiving the wiper motor shaft, and, upon completion of said connection, disengaging said hook of the wiper link from the cowl fore plate, inserting the wiper motor shaft through said insertion hole, and affixing said wiper motor to the cowl.

2. A method as recited in claim 1, wherein said joint of the wiper link is made of a flexible material so as to be press-fitted into a central space of said joint of said wiper motor.

3. A method as recited in claim 1 or 2, wherein said hook is formed into a shape fitting with the insertion hole such that said temporary engagement can be easily achieved.

4. A method as recited in claim 1, wherein an axis of said rotary joint connector of the wiper link is held accurately perpendicular to a surface of the cowl fore plate when the hook is temporarily engaged with the insertion hole.

* * * * *